Aug. 19, 1941.   G. FORTON   2,252,967
GEARING
Filed Sept. 26, 1940

Inventor
George Forton
By J.S. Murray
Attorney

Patented Aug. 19, 1941

2,252,967

UNITED STATES PATENT OFFICE 2,252,967

GEARING

George Forton, Detroit, Mich.

Application September 26, 1940, Serial No. 358,470

4 Claims. (Cl. 74—413)

This invention relates to gearings and particularly change-speed gearings.

An object of the invention is to provide a speed-changing gearing for driving one of two aligned shafts from the other, such gearing being readily reversible with relation to the two shafts, and hence adaptable to either increase or decrease the speed of the driven shaft.

Other objects are to provide in an improved manner for taking care of end thrust and preventing escape of lubricant from a housing for the gearing.

These and various other objects the invention attains by the construction hereinafter described and illustrated in the accompanying drawing, wherein.

Figure 1:
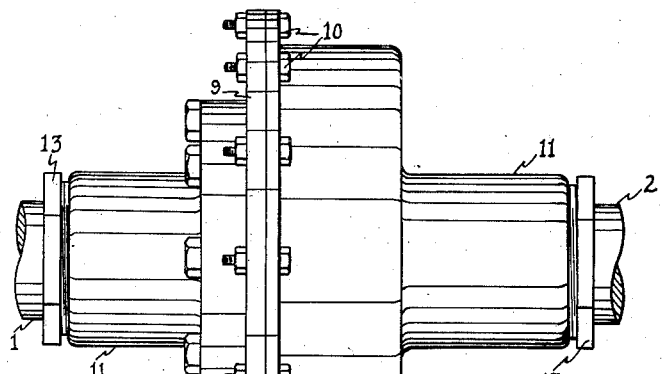
Fig. 1 is a side elevational view of the housing enclosing the improved gearing.
Figure 2:
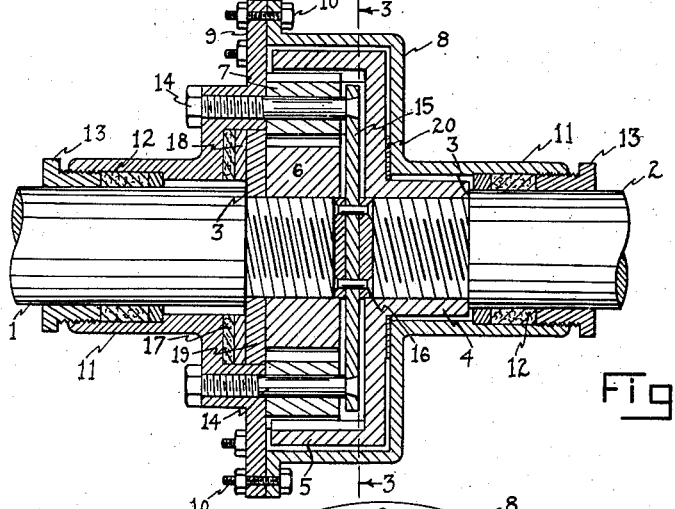
Fig. 2 is an axial sectional view of the same.
Figure 3:
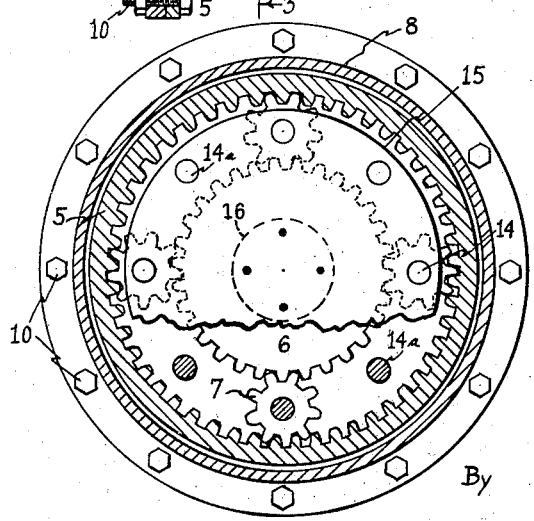
Fig. 3 is a cross-sectional view taken on the line 3—3 of Fig. 2.

In these views, the reference characters 1 and 2 designate two aligned shafts having adjacent end portions slightly reduced in diameter so as to form annular shoulders 3, such end portions being screw-threaded. Screwed on one of said end portions is the hub 4 of an annular internal gear 5, and a gear 6 screwed upon the other shaft end portion lies centrally within the annular gear. A plurality of pinions 7, (four being provided in the disclosed construction) intermesh with the gears 5 and 6, establishing a drive from one to the other.

The described gears occupy a circular housing 8 having a detachable cover plate 9 bolted thereto as indicated at 10, a pair of oppositely projecting elongated sleeves 11 being formed integrally with the housing and cover plate and respectively accommodating the respective shafts, such sleeves receiving suitable packing 12 surrounding the shafts and compressed by nuts 13.

Each pinion 7 is journaled on a pin 14 fixedly carried by the cover plate 9, said pins extending through and being screwed into the cover plate and being headed against the outer face of the latter. The inner ends of the pins 14 are rigidly engaged and interconnected by a circular plate 15, the pins being thus reinforced and held in proper parallelism. Preferably four additional pins 14a, duplicating and alternating with the pins 14, are mounted on the cover plate, acting through the plate 15 to further reinforce the pins 14. These additional pins may further serve as a reserve mounting to which the pinions 7 may be transferred in case the pins 14 become unduly worn.

The center portion of the plate 15 lies between the shafts 1 and 2 and it is preferred to rivet disks 16 of brass or other suitable bearing metal to opposite faces of said center portion to provide for the transmission of end thrust from one to the other of said shafts.

The inner portion of the cover plate 9 preferably forms an annular recess interiorly of the gear housing to receive compressible packing 17 beneath an annular metal ring 18 and a thrust-transmitting annular disk 19 having its inner marginal portion clamped between the pinion 6 and the shoulder 3 of the shaft passing through said cover plate.

To further minimize friction, it is preferred to snugly mount a washer 20 of brass or other anti-friction metal on the hub 4 between the inner portion of the gear 5 and the housing 8.

In operation of the described gearing, the several packings 12, 17 and 20 serve to retain within the housing 8 a suitable lubricant for the rotating parts. Said housing is restrained from rotation in any desired manner and power is applied to one or the other of the shafts 1 and 2 accordingly as it is desired to increase or reduce the transmitted speed.

A speed-reducing effect is derived if the shaft 2 is driven from the shaft 1, while a reverse drive increases the transmitted speed.

The construction is desirably simple, and the entire installation may be easily reversed, in its relation to the two shafts if it is desired to change the speed at which one or the other shaft is driven.

The described gearing is particularly applicable for effecting a desired step-up of speed between the engine and propeller of air craft or water craft.

The invention is presented as including all such changes and modifications as come within the scope of the following claims.

What I claim is:

1. In a change speed gearing, the combination with aligned driving and driven shafts, having adjacent ends, of an annular internal gear fixed on one of said ends, a gear fixed on the other of said ends and chambered within the annular gear, a plurality of pinions disposed between and meshing with both of the first mentioned gears, a housing for said gears and pinions having a removable cover plate substantially transverse to said shafts, pins carried at corresponding ends thereof by said cover plate and journaling said pinions, and a reinforcing connection between the other ends of said pins.

2. In a change speed gearing, the combination with aligned driving and driven shafts, having adjacent ends, of an annular internal gear fixed on one of said ends, a gear fixed on the other of said ends and chambered within the annular gear, a plurality of pinions disposed between and meshing with both of the first mentioned gears, a housing for said gears and pinions having a removable cover plate substantially transverse to said shafts, pins carried by said cover plate and journaling said pinions, said pins having corresponding ends rigidly mounted on the cover plate, a plate forming a reinforcing connection between the other ends of said pins, and extending between the two shafts and wear plates carried by the central portion of the reinforcing plate for transmitting thrust between the shafts.

3. In a change speed gearing, the combination with aligned driving and driven shafts, having adjacent ends, of an annular internal gear fixed on one of said ends, a gear fixed on the other of said ends and chambered within the annular gear, a plurality of pinions disposed between and meshing with both of the first mentioned gears, a housing for said gears and pinions having a removable cover plate substantially transverse to said shafts, pins carried by said cover plate and journaling said pinions, said cover plate having its inner face formed in its inner portion with an annular recess, packing in said recess, and a plate in said recess compressing said packing.

4. In a change speed gearing, the combination with aligned driving and driven shafts, having adjacent ends, of an annular internal gear fixed on one of said ends, a gear fixed on the other of said ends and chambered within the annular gear, a plurality of pinions disposed between and meshing with both of the first mentioned gears, a housing for said gears and pinions having a removable cover plate substantially transverse to said shafts, pins carried by said cover plate and journaling said pinions, said pins having corresponding ends rigidly mounted on the cover plate, and a plate forming a reinforcing connection between the other ends of said pins, and extending between the two shafts.

GEORGE FORTON.